United States Patent
Bhushan et al.

(10) Patent No.: US 12,066,901 B2
(45) Date of Patent: Aug. 20, 2024

(54) PROTECTING DATABASES IN A CLUSTERLESS AVAILABILITY GROUP

(71) Applicant: EMC IP Holding Company LLC, Hopkinton, MA (US)

(72) Inventors: Bharat Bhushan, Bangalore (IN); Niketan Kalaskar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 490 days.

(21) Appl. No.: 17/154,268

(22) Filed: Jan. 21, 2021

(65) Prior Publication Data

US 2022/0229741 A1 Jul. 21, 2022

(51) Int. Cl.
*G06F 11/00* (2006.01)
*G06F 11/14* (2006.01)
*G06F 16/27* (2019.01)
*G06F 16/28* (2019.01)

(52) U.S. Cl.
CPC ...... *G06F 11/1469* (2013.01); *G06F 11/1451* (2013.01); *G06F 11/1464* (2013.01); *G06F 16/27* (2019.01); *G06F 16/284* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 7,689,602 | B1* | 3/2010 | Sim-Tang | G06F 11/1448 707/673 |
| 9,519,664 | B1* | 12/2016 | Kharatishvili | G06F 16/27 |
| 9,613,120 | B1* | 4/2017 | Kharatishvili | G06F 16/2358 |
| 9,934,107 | B1* | 4/2018 | Chikkanayakanahally | G06F 11/1456 |
| 10,474,539 | B1* | 11/2019 | Yadav | G06F 11/1464 |
| 10,579,610 | B2* | 3/2020 | Kharatishvili | G06F 16/23 |
| 10,929,428 | B1* | 2/2021 | Brahmadesam | G06F 16/2379 |
| 2011/0219035 | A1* | 9/2011 | Korsunsky | H04L 63/102 707/E17.005 |
| 2013/0268920 | A1* | 10/2013 | Ursal | G06F 8/70 717/131 |
| 2017/0052856 | A1* | 2/2017 | Subbarayalu | G06F 11/2023 |
| 2017/0063659 | A1* | 3/2017 | Platon | H04L 45/20 |
| 2017/0206236 | A1* | 7/2017 | Kharatishvili | G06F 16/23 |

* cited by examiner

*Primary Examiner* — Farhan M Syed
(74) *Attorney, Agent, or Firm* — Staniford Tomita LLP (57) ABSTRACT

A determination is made that a backup of a database in an availability group provided by a relational database management system (RDBMS) should be performed. The availability group includes a node functioning as a primary node and hosting a primary replica of the database and one or more other nodes functioning as secondary nodes and hosting secondary replicas of the database. The availability group is a clusterless availability group in which the one or more other nodes functioning as secondary nodes are not available as automatic failover targets should the primary node become unavailable. A command is issued to a node in the availability group to obtain a globally unique identifier (GUID) of the availability group. The node is instructed to index a backup of the database against the GUID of the availability group.

19 Claims, 9 Drawing Sheets

Availability Group Properties – AG1 – Backup Preferences

Where should backups occur?

○ Prefer Secondary
Automated backups for this availability group should occur on a secondary replica. If there is no secondary replica available, backups will be performed on the primary replica.

○ Secondary only
All automated backups for this availability group must occur on a secondary replica.

● Primary
All automated backups for this availability group must occur on the current primary replica.

○ Any Replica
Backups can occur on any replica in the availability group.

Replica backup priorities

| Server Instance | Backup Priority (lowest=1, highest=100) | Exclude Replica |
|---|---|---|
| WIN19SQL19N1\S19NODE94 | 50 | |
| WIN19SQL19N2\S19NODE95 | 50 | |

[ OK ] [ Cancel ]

```
ddbmsqlsv.exe -a SKIP_CLIENT_RESOLUTION=TRUE -c AAG1_ef770eaf-ebe3-f5be-bdff-3a7243ff1236 -l full -y +30d -a
"NSR_DFA_SI_DD_HOST=10.31.197.61" -a "NSR_DFA_SI_DD_USER=sysadmin" -a "NSR_DFA_SI_DEVICE_PATH=/dd_path" -a
"NSR_DFA_SI_DD_LOCKBOX_PATH=C:\Program Files\DPSAPPS\common\lockbox" -a
"NSR_SKIP_NON_BACKUPABLE_STATE_DB=TRUE" MSSQL$S12SQL17N1#AAG1:aag1db1
```

```
ddbmsqlrc.exe -a NSR_DFA_SI_DD_HOST=10.31.197.61 -a NSR_DFA_SI_DD_USER=sysadmin -a NSR_DFA_SI_DEVICE_PATH=/dd_path -a
"NSR_DFA_SI_DD_LOCKBOX_PATH=C:\Program Files\DPSAPPS\common\lockbox" -c aag1_ef770eaf-ebe3-f5be-bdff-3a7243ff1236 -a
"SKIP_CLIENT_RESOLUTION=TRUE" -C "'aag1db1'='C:\Program Files\Microsoft SQL Server\MSSQL14.S12SQL17N2\MSSQL\DATA\
aag1db1.mdf', 'aag1db1_log'='C:\Program Files\Microsoft SQL Server\MSSQL14.S12SQL17N2\MSSQL\DATA\aag1db1_log.ldf'" -f -t "05/29/
2019 02:21:22 PM" -S normal -$ "MSSQL$S12SQL17N2:" -d MSSQL$S12SQL17N1:aag1db1 MSSQL$S12SQL17N2:aag1db1
```

PROTECTING DATABASES IN A CLUSTERLESS AVAILABILITY GROUP

TECHNICAL FIELD

The present invention relates generally to the field of information management, and, more particularly, to data protection.

BACKGROUND

Many organizations rely on relational database management systems (RDBMS) to store, organize, and access data. Relational database management systems store data in a structured format, using rows and columns. Data can be written to the database and accessed from the database using structured query language (SQL). Some examples of relational database management systems include Microsoft SQL Server® as provided by Microsoft Corporation of Redmond, Washington; Oracle Database as provided by Oracle Corporation of Redwood City, California; and others.

The RDBMS may allow for multiple copies or replicas of the database to be hosted across multiple nodes or servers. One of the replicas may be a read-write copy, while other replicas may be read-only copies. Such an architecture can be implemented where an organization has a need for processing large read-only workloads (e.g., reporting).

There remains a need to be able to conduct backups of the database replica. Typically, backup systems and applications index backups against a name of the node that is hosting the database replica. Some relational database management systems allow users to perform manual forced failovers of the database from one node to another node. This can present issues during backups. In particular, after the forced failover, the backup system may not recognize that the database being backed up is the same database that was previously backed up using a different node. As a result, the backup system may conduct a full backup of the database when in fact much of the data may have already been backed up during the previous backup. Conducting a full backup, as compared to backing up only changes, can dramatically increase the time required to complete the backup of the database.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two.

Figure 1:
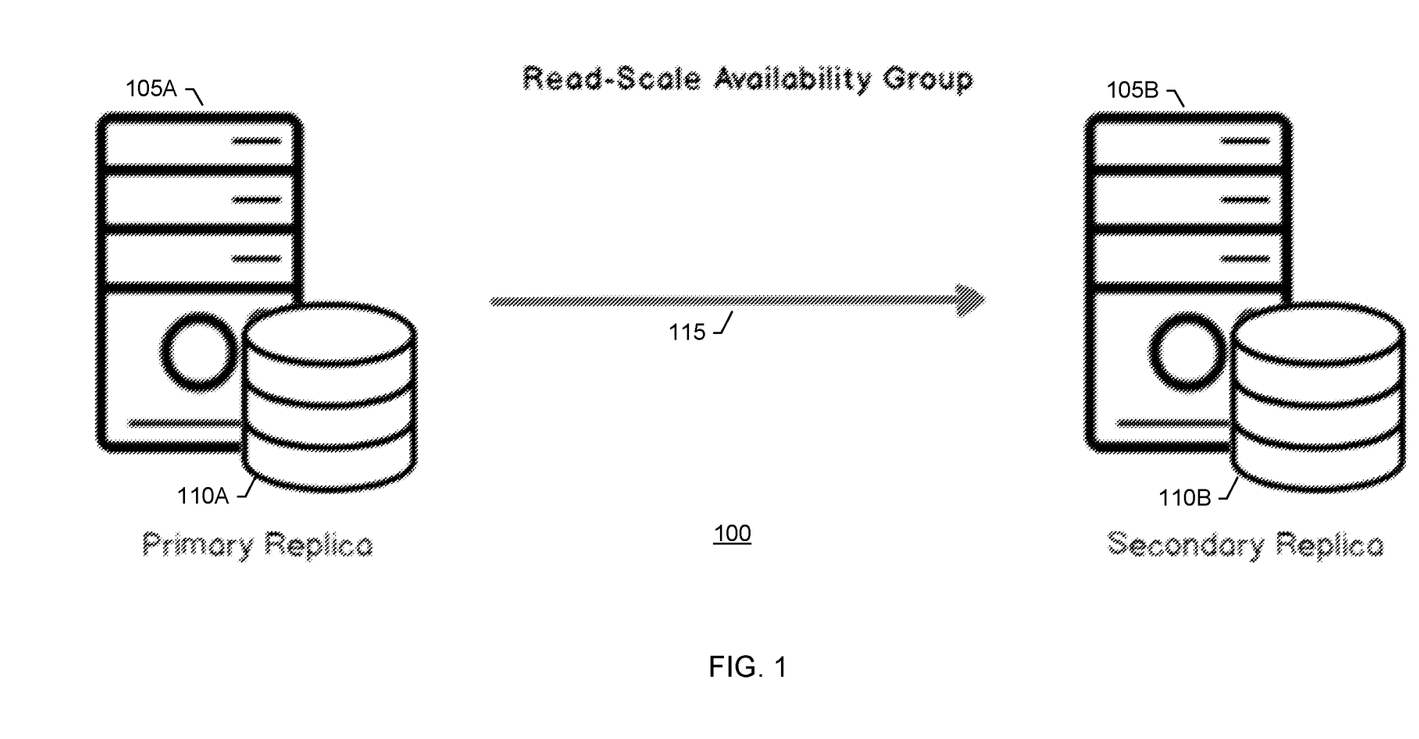
FIG. 1 shows a simplified block diagram of an information handling system having a read-scale or clusterless availability group architecture in accordance with one or more embodiments.

FIG. 1 shows a simplified block diagram of an information system 100 having a group of nodes 105A,B. A node may be referred to as a server or host. The group may be referred to as an availability group (AG). Nodes 105A,B host database replicas 110A,B, respectively. In the example shown in FIG. 1, first node 105A is currently functioning as a primary node and second node 105B is currently functioning as a secondary node. The primary node hosts a primary replica of the database and the secondary node hosts a secondary replica of the database. That is, there are multiple copies of the database spanning across multiple nodes (e.g., first and second nodes) of the availability group. Writes issued to the primary replica at the primary node are replicated 115 to the secondary replica at the secondary node, thereby synchronizing the databases. While FIG. 1 shows a single secondary node, there can be any number of secondary nodes and replicas.

Figure 2:
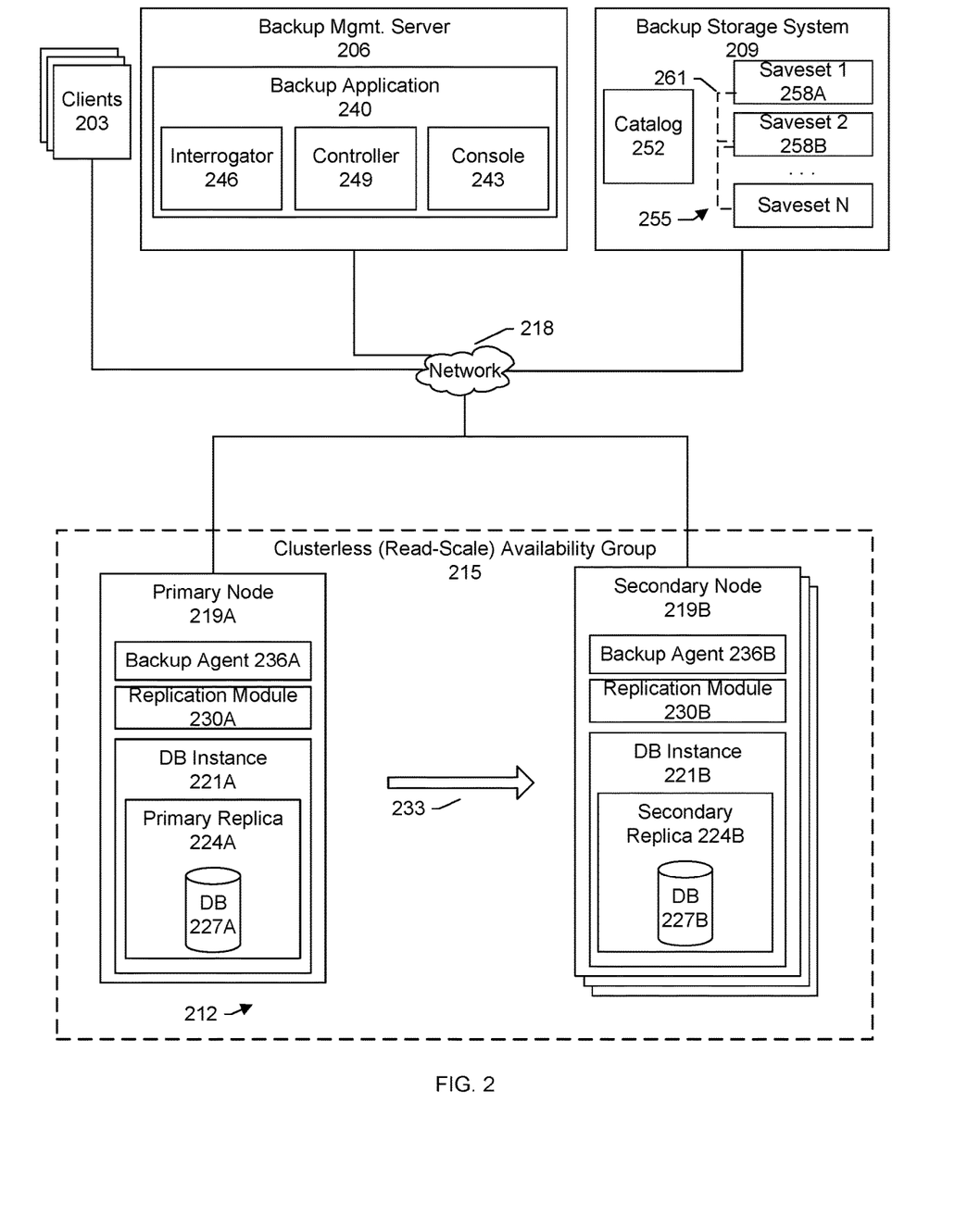
FIG. 2 shows a more detailed block diagram of the clusterless availability group architecture in accordance with one or more embodiments.

FIG. 2 shows a more detailed block diagram of the system shown in FIG. 1. In the example shown in FIG. 2, there are a set of clients 203, a backup management server 206, a backup storage system 209, and a set of nodes or servers 212 configured into a clusterless or read-scale availability group 215. A network 218 interconnects each of the different components.

At any given time, the clusterless availability group may include a node that functions as a primary node and one or more other nodes functioning as secondary nodes. A primary node may be referred to as an active node. A primary node can be a node in the group that processes read-write operations issued by the clients. A secondary node can be a node in the group that processes read-only operations issued by the clients.

More particularly, a primary node 219A hosts a database instance 221A having a primary replica 224A hosting a primary replica or copy 227A of a database (e.g., database and log files). The primary database replica may be a read-write copy that accepts writes issued by the clients. A secondary node 219B hosts a database instance 221B having a secondary replica 224B hosting a secondary replica or copy 227B of the database. The secondary database copy may be a read-only copy. The nodes include replication modules 230A,B to handle replication of changes to the primary database copy to each secondary database copy. That is, changes to the primary database copy may be replicated 233 to each of the secondary database copies at the secondary nodes. Replication of the database can occur asynchronously or synchronously depending upon a configuration of the database system by the administrator user.

Clients can access a database replica (primary or secondary replica of an availability group) through an availability group listener. The listener is a virtual network name (VNN) that clients can connect to in order to access a database in a primary or secondary replica of an availability group. A listener allows a client to connect to a replica without having to know the physical database instance name.

The architecture shown in FIGS. 1 and 2 is of a read-scale availability group. A read-scale availability group may be referred to as a clusterless availability group. An example of a database system in which read-scale availability groups are supported includes Microsoft Windows SQL Server® as provided by Microsoft Corporation of Redmond, Washington SQL Server® is a relational database management system (RDBMS) that runs on a Windows operating system (OS), e.g., Windows 10 or Windows Server 2019. SQL Server® allows users the options of different database configurations and architectures including, for example, standalone, high availability clustering, or read-only scaling. While embodiments are discussed in conjunction with Windows SQL Server®, it should be appreciated that aspects and principles of the systems and techniques described herein can be applied to other relational database management systems provided by other vendors. It should be appreciated that the blocks, components, and modules shown in FIGS. 1, 2, and elsewhere may be functional and there can be many different hardware configurations, software configurations, or both to implement the functions described.

The read-scale availability group allows for spreading large read-only workloads across one or more secondary nodes or secondary replicas. For example, incoming read-write connections may be directed by the listener to the primary node hosting the primary database replica; while incoming read-only connections may be directed by the listener to the secondary nodes hosting the secondary database replicas. This allows compute resources of the primary node to remain dedicated to processing write requests to the database while the secondary nodes handle the read requests such as for purposes of reporting.

In an embodiment, the read-scale availability group is referred to as a clusterless availability group because automatic failover clustering components or services are omitted, excluded, or not configured. That is, in a clusterless or read-scale availability group, the secondary nodes are not available as automatic failover targets should the primary node become unavailable or otherwise suffer a failure. A clusterless or read-scale availability group does not provide high-availability or disaster recovery as might be available in traditional availability groups.

In a traditional availability group architecture, failover agents or clustering components (e.g., Windows Server Failover Cluster (WSFC)) associated with the nodes and database monitor the underlying infrastructure, the health of the nodes, and detect imminent failures. For example, if a failover agent at a first node currently functioning as a primary node detects a problem with the first node, the failover agent can coordinate with another failover agent at a second node to automatically failover the database from the first to second node. Upon the failover, the second node assumes the role of the primary node to accept the incoming read-write connections. When the problem with the first node is resolved and the first node becomes online and available, the second node can transition back to functioning as a secondary node and the first node can again assume the role of the primary node. Alternatively, the first node can be brought up as a secondary node while the second node continues to function as a primary node.

In a clusterless or read-scale availability group, such automatic failover is not available. There are no configured cluster components to detect imminent failures or to monitor the health of the nodes. Instead, if an administrator user wishes to swap the role of a node currently functioning as a secondary node to that of a primary node, the administrator must perform a manual forced failover. The benefit of a clusterless or read-scale availability group, however, is that the administrator user does not have to perform the configuration that would be required in a failover cluster architecture. Configuring failover clustering increases deployment complexity. Thus, if an organization does not have a need for high-availability and simply requires handling of large read-only workloads, the organization can configure a clusterless or read-scale availability group.

There remains a need to conduct (and restore) backups of the database in a clusterless or read-scale availability group. Conducting regular backups helps to protect against corruption (e.g., corruption due to bugs such as storage firmware bugs), human error, hackers, and other potential problems. Thus, the system shown in FIG. 2 includes a backup system including the backup server, backup storage system, and backup agents 236A,B installed at each node of the clusterless availability group. The backup server includes a backup application 240 including a console 243, an interrogator 246 and controller 249. The backup storage system includes a catalog 252 and savesets 255 into which backups of the database are stored.

The backup server with backup application is responsible for managing the backup (and recovery) of the database. In particular, the console provides a user interface to the backup application and allows an administrator to configure the backup system. The interface may include a graphical user interface (GUI). The GUI allows the administrator to browse the various backups of a database that are available for restore. Configuration may include defining backup policies, backup windows and schedules, backup levels (e.g., full backup, logs only backup, cumulative incremental backups), backup frequency, backup rules, and the like.

Backups may be specified as savesets. A saveset may include attributes identifying source data to be backed up and other configuration information. A saveset may identify a database instance (e.g., SQL Server instance) for backup. When a time to conduct a backup arrives, the backup application may parse the saveset to identify, among other things, the data source to be backed up and type of backup to perform. For example, the administrator user may use the console to define a backup strategy or policy in which a full backup of the database is performed weekly, such as on a Sunday or other day that experiences low demand, while a logs-only backup is performed daily. Thus, a saveset may include may include the database itself, transaction logs associated with the database, or both.

Savesets are written to media of the backup storage system. A saveset may include a single file or multiple files. A saveset may include actual data that is backed up along with associated metadata describing the data included in the backup. The metadata may include, for example, a timestamp of the backup, unique identifier against which the backup is indexed, and other attributes. Backup data within a saveset at the backup storage system may be stored in a format different from an original format used by the database system. For example, the backup may be saved in a compressed or deduplicated format.

The catalog stores indexing information and other metadata about the various savesets. The administrator user can browse the catalog to see the various backups of the database that are available for restoring. In an embodiment, backups of a database may be browsed using a unique identifier against which the backup was indexed.

More particularly, conducting a backup involves indexing the backup including generating and storing metadata about the backup. Indexing allows the backups to be browsed and searched such as for purposes of restore. Indexing further facilitates chaining different backups taken of the same database over a period of time. This allows for conducting a full backup of a database at an initial time and an incremental or differential backup of the database at a subsequent time by recognizing, at the subsequent time, that the database about to be backed up is the same database upon which a full backup was previously conducted. Limiting a backup to changes since a last or previous backup can allow the backup to be completed much faster as compared to conducting a full backup.

Indexing a backup against a name of a node or host on which the backup of the database was performed is problematic in architectures having clusterless or read-scale availability groups where there is no underlying cluster and where a node at which a backup of a database is taken may change over time as a result of a forced failover. For example, typically, in a clustered environment backups are performed through a Windows cluster name resource (virtual host). But in the case of a clusterless availability group, there is no option for a Windows cluster name resource because clustering has not been configured. There is no cluster name. The other virtual host for an availability group is the availability group listener. The user can configure a listener in a clusterless availability group using an Internet Protocol (IP) address of the primary replica and a port number of the primary replica.

There are problems with backups, however, when a force failover occurs. In an availability group, the listener contains the IP address and port number of the primary replica. In a forced failover, the listener is dropped and recreated to have an IP address and port of the new primary replica. The listener is again registered in the domain name service (DNS) to point out the correct IP address. Due to this problem, performing backups through the availability group listener resource cannot be relied upon.

In an embodiment, backups of databases that are part of the clusterless availability group are performed through same client resource irrespective of whichever physical node is the primary node of the clusterless availability group. In the case of a clusterless availability group the common attribute among all replicas is the globally unique identifier (GUID) that is generated and assigned to the availability group by the relational database management system, e.g., "AGName_AGGUID." In the case of a clusterless availability group, the attribute "AGName_AGGUID" is used as the client name against which backups of the database are indexed.

An example of a command to obtain an availability group GUID from the database system is as follows:

"select group_id from sys.availability_groups where name='ag1'"

Using the availability group GUID to index the database replica backups (rather than a name of a node hosting the database replica), allows for tracking and chaining all levels of a database backup even if different physical nodes belonging to a clusterless availability group are used to do the backups. During a restore, the user can select the availability group GUID, e.g., "agName_agGUID" as the host (e.g., SQL Server host) and all the instances and databases backed up with this client name will be listed. The user can select the backup from the list and a destination host to which the backup is to be restored.

The backup application coordinates with a backup agent at a node in the clusterless availability group to backup a database replica hosted by the node to the backup storage system. In an embodiment, the interrogator of the backup application is responsible for querying a node of the clusterless availability group (e.g., primary node) to obtain backup configuration information, backup preferences, or other settings associated with performing the backup. These settings may be stored by the database system (e.g., SQL Server) and separate from the backup application. Thus, the administrator user can configure at least a portion of the backup configuration settings using an interface of the database system and with which the administrator may already be familiar with.

Figure 3:
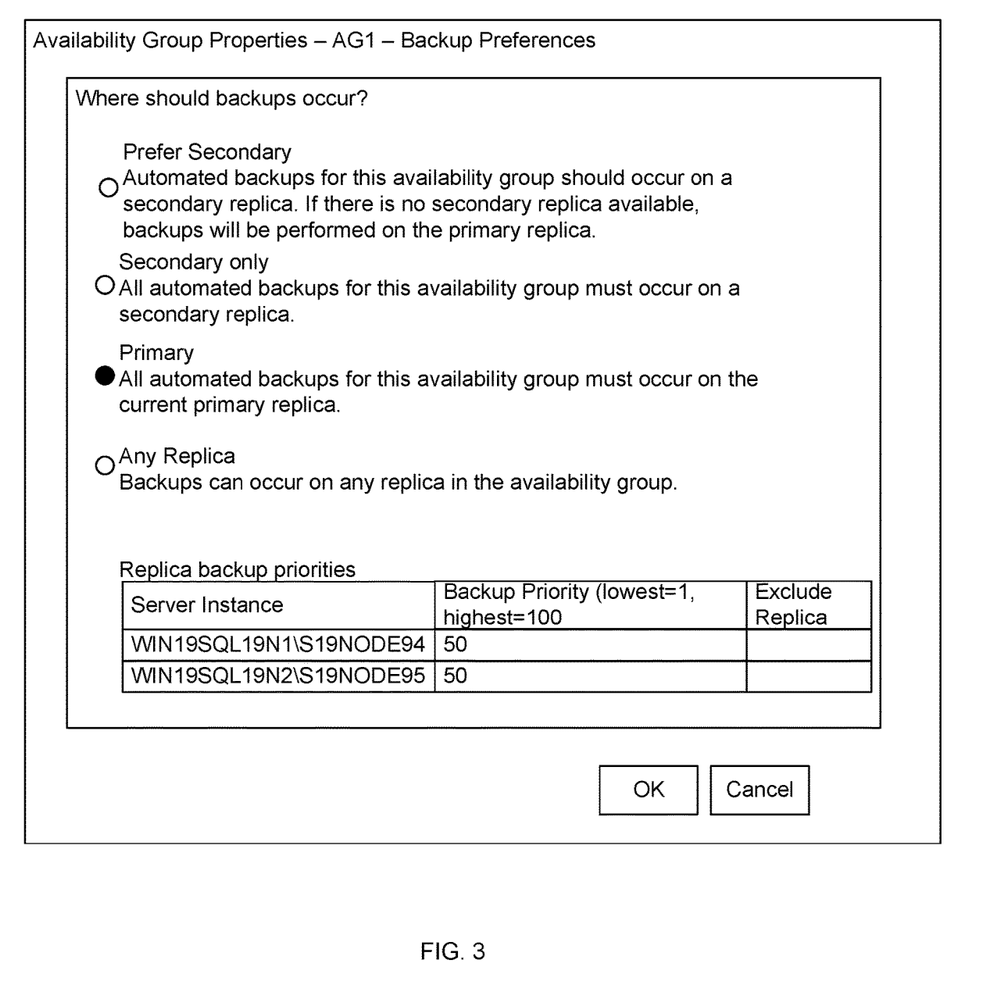
FIG. 3 shows an interface of an RDBMS for setting backup preferences in accordance with one or more embodiments.

FIG. 3 shows an example of a dialog box that may be provided the relational database management system to specify backup preferences. In a specific embodiment, the settings include a preference specifying whether backups should be performed using a primary node or a secondary node of a clusterless availability group. For example, the administrator user may designate a secondary node to use for backups. Performing backups using a secondary node allows a primary node to remain dedicated to servicing client production requests. In some cases, however, certain backup operations and options may require performing backups using a primary node. For example, in some cases, differential backups may require conducting such backups on a non-copy-only source. That is, differential backups may not be supported on a secondary node. Thus, the administrator user may instead specify that backups be triggered on the primary node in order to take advantage of the benefits of differential backups. As another example, log backups may not be able to be truncated on the secondary node. Truncating a log after a backup may require performing the backup on the primary node.

Upon obtaining the GUID of the clusterless availability group and node at which the backup should be triggered, the backup application controller directs the preferred node in the availability group to perform a backup of the database replica hosted by the node. The preferred node may be a node functioning as a primary node.

In other words, the interrogator, prior to conducting a backup, is responsible for querying the database system to obtain the GUID of the clusterless availability group. For example, a query or command may be transmitted to an active node of the database system. The returned information, including the GUID of the clusterless availability group, may be passed to the controller. The controller then directs or instructs the appropriate or preferred node of the availability group to launch a backup of the database replica hosted by the node. In an embodiment, the instructing includes passing the value of the GUID to the node so that the node can index the backup against the GUID of the clusterless availability group.

More particularly, the backup application controller passes to the preferred node (or, more specifically, to the backup agent at the preferred node) the availability group GUID and an instruction to index the backup of the database using the availability group GUID. Using the availability group GUID rather than, for example, the name of the node conducting the backup allows for maintaining an unbroken chain of backups for the database even if backups are triggered from different nodes as might occur as a result of a forced failover.

That is, savesets or backups of the database are configured with and stored under the availability group GUID and not the name of the node at which a backup is triggered. The availability group GUID is a value that is generated or created by the relational database system in order to uniquely identify the availability group. The availability group GUID is different from a name of the clusterless availability group. The name of the availability group is a value that is input or provided by the user. Two (or more) different SQL Servers might have availability groups with the same name and both servers might be configured to backup to the same backup server. Thus, from the perspective of the backup server, a user-assigned name of an availability group may not necessarily be a unique value. The availability group GUID, however, will be always unique. Whenever a user uses the database system to create an availability group for their database, a GUID for the availability group is created automatically by the database system. The user or backup software does not need to create the availability group GUID separately. Using the availability group GUID allows the backup system to manage and track database backups originating from multiple availability groups even if the user has assigned the same name to two or more different availability groups.

Referring back now to FIG. 2, a first saveset 258A may correspond to an initial backup of a database at a first time. The initial backup may have been conducted or triggered on a first node in the clusterless availability group. A second saveset 258B may correspond to a subsequent backup of the database at a second time, after the first time. The subsequent backup may have been conducted or triggered on a second node in the clusterless availability group, different from the first node. Such a scenario may be present when a forced failover has occurred.

Both savesets or backups, however, may be linked 261 using a GUID of the clusterless availability group. Thus, each saveset may be associated with or include metadata specifying the availability group GUID. This allows for maintaining a continuous backup chain for the database regardless of where or on what node the backup was triggered; and for the subsequent backup to be conducted as an incremental or differential backup. Different backups of the same database conducted on different host nodes or servers of the clusterless availability group are linked and stored under the same clusterless availability group GUID. In particular, indexing the saveset or backup against the availability group GUID allows for recognizing that the subsequent backup can be a differential backup because the database currently being backed up is the same database that was previously backed up during the initial backup.

In an embodiment, the catalog includes an index for the database backups. The index may include a set of directories. A name of a top level directory may correspond to a GUID of the availability group, rather than a name of a particular host node or server. Within the directory, there can be a set of savesets. Each saveset may correspond to a backup at a particular time of a database (or more particularly, database replica) in the clusterless availability group. At least some of the backups may have been conducted using different nodes, hosts, or servers in the clusterless availability group hosting the database replicas. Each saveset, however, may include or be associated with an attribute identifying the availability group GUID. This allows for maintaining a relationship structure among the backups of a particular database even if the backups were conducted using different nodes, hosts, or servers in the clusterless availability group.

Figure 4:
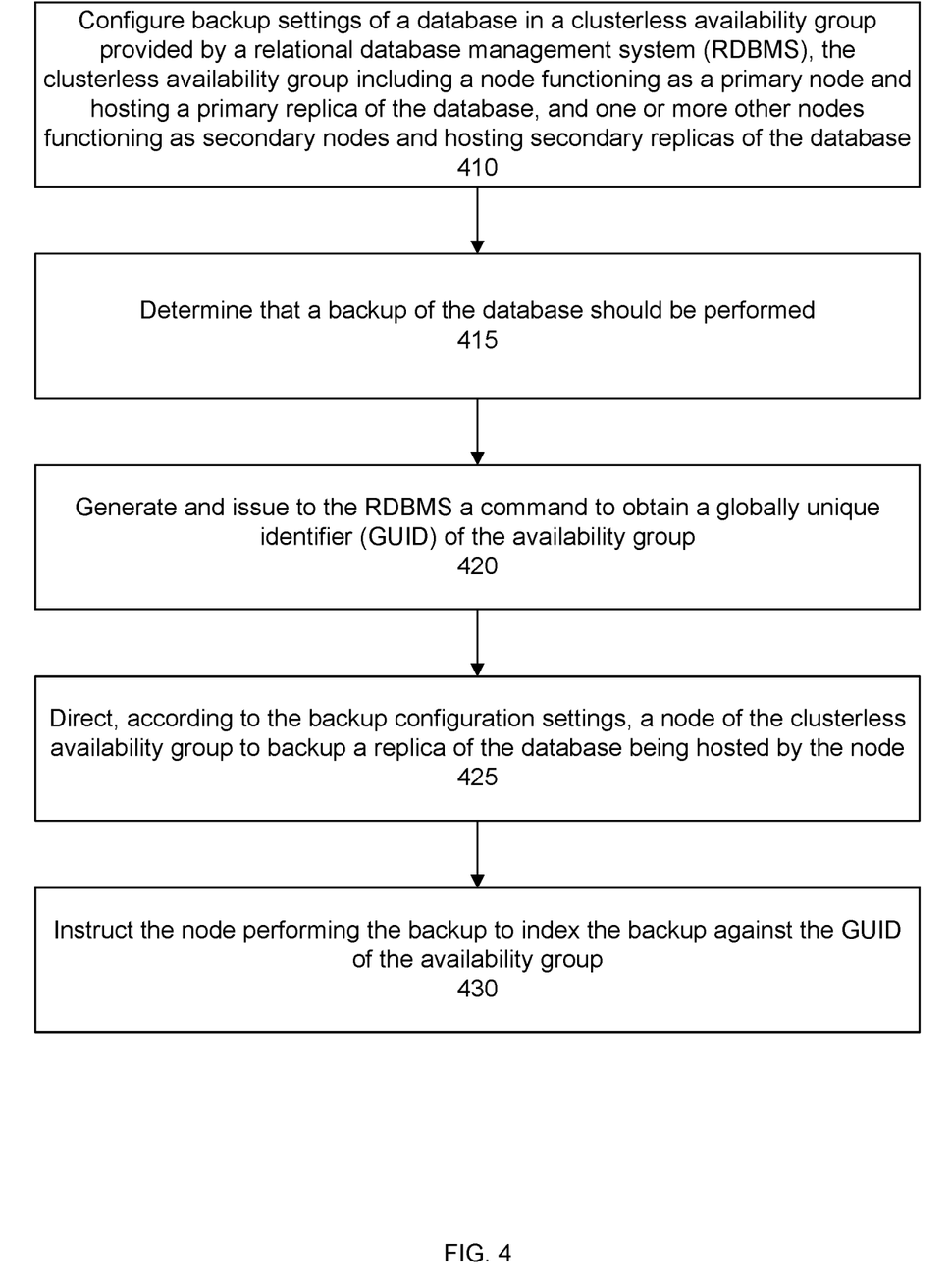
FIG. 4 shows an overall flow for conducting backups in the clusterless availability group architecture in accordance with one or more embodiments.

FIG. 4 shows an overall flow for performing backups of a database in a clusterless availability group. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, backup settings for a database in a clusterless availability group provided by a relational database management system are configured. The configuration may include setting backup preferences in the RDBMS specifying where backups should occur, e.g., perform backup on a secondary replica or perform backup on a primary replica. The configuration may include setting backup policies in the backup application, e.g., defining a backup window or schedule, defining a backup strategy (e.g., weekly full backups and daily incremental backups), and specifying backup level (e.g., full backup, incremental backup, or both).

In a step 415, a determination is made that a backup should be performed. In an embodiment, the determination may include determining that a time for the backup has arrived according to the backup schedule. In another embodiment, the determination may be a result of receiving an on-demand request from the user to perform the backup. For example, the backup application may display on a self-service user interface a listing of availability groups. The listing may include the names the user assigned to the availability groups during their creation. The listing may include clustered availability groups, clusterless availability groups, or both. The user can select an availability group from the listing to backup.

In a step 420, upon the user selecting a clusterless availability group to backup, the backup application (e.g., backup application interrogator) generates and issues to the RDBMS a command to obtain a globally unique identifier of the selected availability group. The command may be transmitted to an active or primary node in the availability group. In an embodiment, the command line generated includes a first parameter (referred to as a "-c" parameter) and a second additional parameter (referred to as an "-a" parameter). Specifically, the command line generated includes the 'AGName_AGGUID' as the '-c' parameter and '-a SKIP_CLIENT_RESOLUTION=TRUE' as an additional parameter to skip the client resolution for 'AGName_AGGUID' since it is not a computer object in the directory service (e.g., Windows Active Directory (AD)). Below is an example of the command to obtain the GUID of the clusterless availability group (e.g., AGGUID):

"select group_id from sys.availability_groups where name='ag1'"

Figure 5:
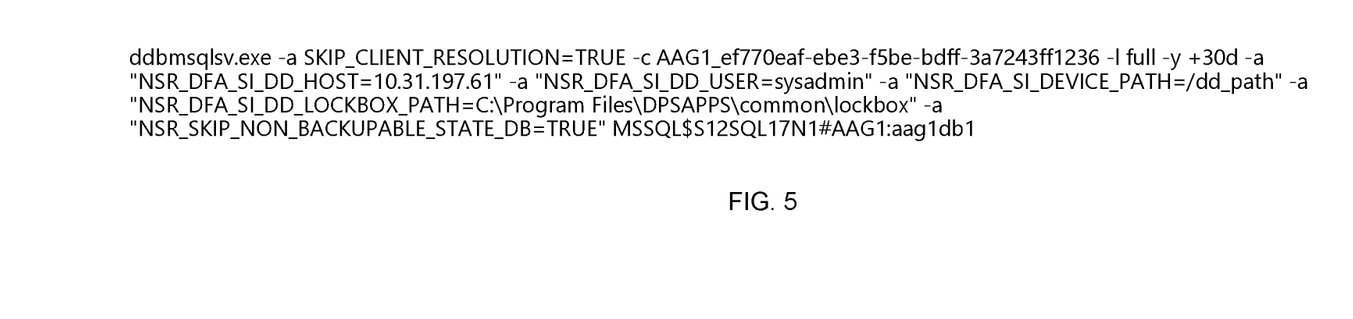
FIG. 5 shows an example of a command for obtaining a GUID of a clusterless availability group in accordance with one or more embodiments.

FIG. 5 shows an example of the full command line.

Referring back now to FIG. 4, in a step 425, the backup application (e.g., backup application controller) directs, according to the backup configuration settings, a node of the clusterless availability group to backup a replica of the database being hosted by the node to the backup storage system. Depending upon the backup configuration settings, the backup application may issue the backup instruction to a primary node of the clusterless availability group in order to perform the backup on a primary replica of the database. Alternatively, the backup application may issue the backup instruction to secondary node of the clusterless availability group in order to perform the backup on a secondary replica of the database.

In a step 430, the backup application instructs the node performing the backup to index the backup against the GUID of the clusterless availability group. As discussed, the "group_id" parameter stores the unique identifier of the availability group that is created by the relational database management system and assigned to the availability group. The GUID is different from a name of the availability group that may be created and assigned by the user. An organization may have multiple nodes or servers running instances of the RDBMS (e.g., SQL Server) in which the user has created two or more clusterless availability groups with the same name that are to be backed up to the same backup storage system. Thus, the name of the clusterless availability group may not necessarily be a unique value, whereas the GUID of the availability group will be a unique value.

Figure 6:
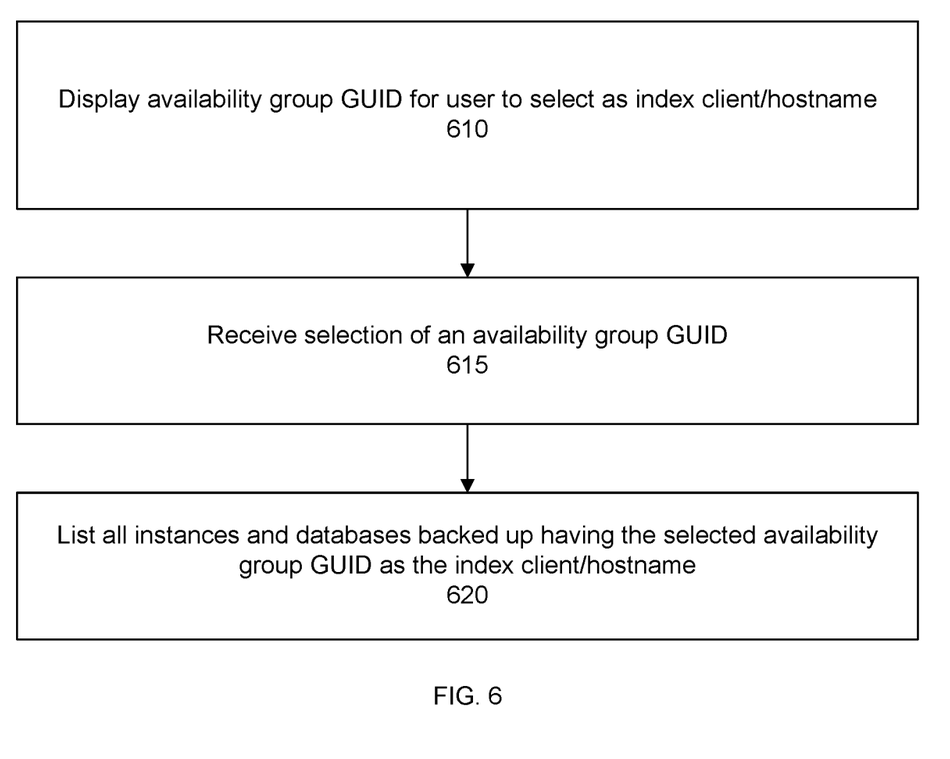
FIG. 6 shows a flow for restoring backups in accordance with one or more embodiments.
Figure 7:
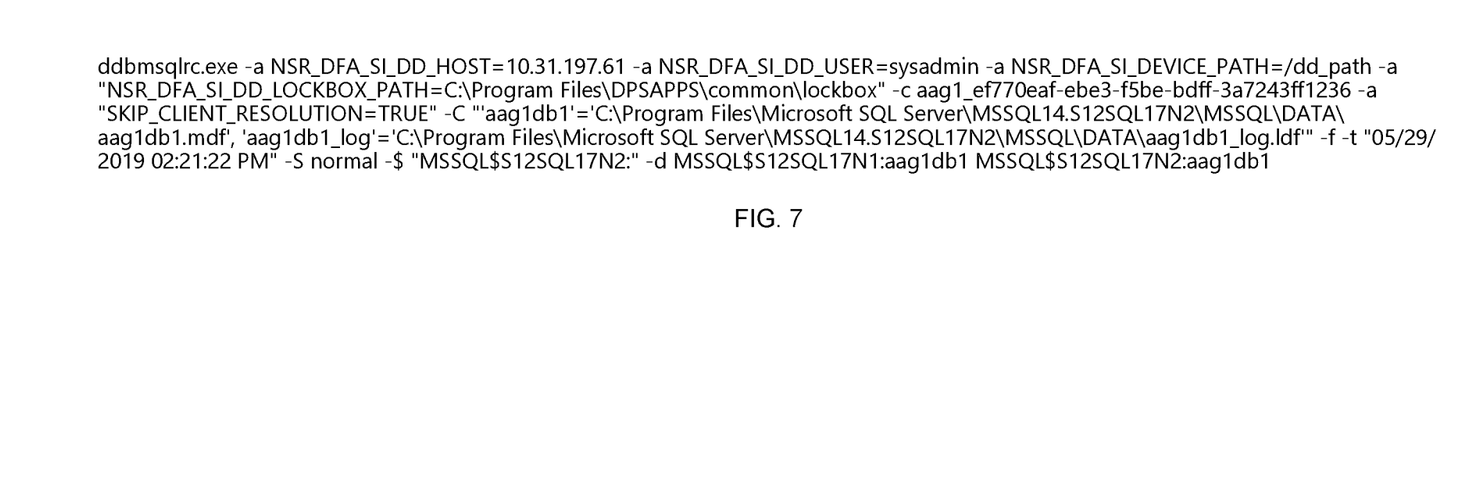
FIG. 7 shows an example of a command for listing instances and databases backed up against a GUID of a clusterless availability group in accordance with one or more embodiments.

FIG. 6 shows an overall flow for performing a restore. In a step 610, the backup application displays a listing of availability group GUIDs for the user to select as the index client or hostname against which the backup was conducted. In a step 615, a selection of an availability group GUID is received. In a step 620, the backup application lists all instances and databases backed up having the selected availability group GUID as the index client or hostname. The user can then select particular backup of the database at a particular time to restore the database to the particular time. FIG. 7 shows an example of a command line for the restore.

In an embodiment, systems and techniques are provided to backup a database of a clusterless availability group irrespective of whichever is primary node and still maintain the backup chain for the database. For example, if a failover event happens where another node transitions to primary node, the backup still be conducted seamlessly—the database backup chain will be maintained and there is no need to perform full backups when a failover happens because the availability group GUID (e.g., "AGName_AGGUID") is used as the client name for indexing regardless of which node in an availability group conducts the backup.

In an embodiment, there is a method comprising: determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database, wherein the primary replica is available for read-write connections and the secondary replicas are available for read-only connections, and wherein the availability group is a clusterless availability group in which the one or more other nodes functioning as secondary nodes are not available as automatic failover targets should the primary node become unavailable; issuing, to a node in the availability group, a command to obtain a globally unique identifier (GUID) of the availability group; and directing, for an initial backup of the database, the node to backup a replica of the database being hosted by the node, the directing for the initial backup comprising instructing the node to index the initial backup against the GUID of the availability group.

The GUID of the availability group is generated and assigned to the availability group by the RDBMS. The GUID of the availability group is different from a name of the node and a name assigned to the availability group by a user.

In an embodiment, the node in the availability group is a first node and the method further comprises: directing, for a subsequent backup of the database, a second node in the availability group to backup a replica of the database being hosted by the second node, the directing for the initial backup comprising instructing the second node to index the subsequent backup against the GUID of the availability group, and wherein the initial backup of the database comprises a full backup, and the subsequent backup of the database comprises a differential backup. The method may include linking the initial and subsequent backups of the database using the GUID of the availability group.

In an embodiment, after the initial backup of the database is completed, the database is forced by a user to failover to another node in the availability group, the other node being a second node, and the method further comprises: issuing, to the second node in the availability group, a command to obtain the GUID of the availability group; and directing, for a subsequent backup of the database, the second node to backup a replica of the database being hosted by the second node, the directing for the subsequent backup comprising instructing the second node to index the subsequent backup against the GUID of the availability group.

In another embodiment, there is a system comprising: a processor; and memory configured to store one or more sequences of instructions which, when executed by the processor, cause the processor to carry out the steps of: determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database, wherein the primary replica is available for read-write connections and the secondary replicas are available for read-only connections, and wherein the availability group is a clusterless availability group in which the one or more other nodes functioning as secondary nodes are not available as automatic failover targets should the primary node become unavailable; issuing, to a node in the availability group, a command to obtain a globally unique identifier (GUID) of the availability group; and directing, for an initial backup of the database, the node to backup a replica of the database being hosted by the node, the directing for the initial backup comprising instructing the node to index the initial backup against the GUID of the availability group.

In another embodiment, there is a computer program product, comprising a non-transitory computer-readable medium having a computer-readable program code embodied therein, the computer-readable program code adapted to be executed by one or more processors to implement a method comprising: determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database, wherein the primary replica is available for read-write connections and the secondary replicas are available for read-only connections, and wherein the availability group is a clusterless availability group in which the one or more other nodes functioning as secondary nodes are not available as automatic failover targets should the primary node become unavailable; issuing, to a node in the availability group, a command to obtain a globally unique identifier (GUID) of the availability group; and directing, for an initial backup of the database, the node to backup a replica of the database being hosted by the node, the directing for the initial backup comprising instructing the node to index the initial backup against the GUID of the availability group.

Figure 8:
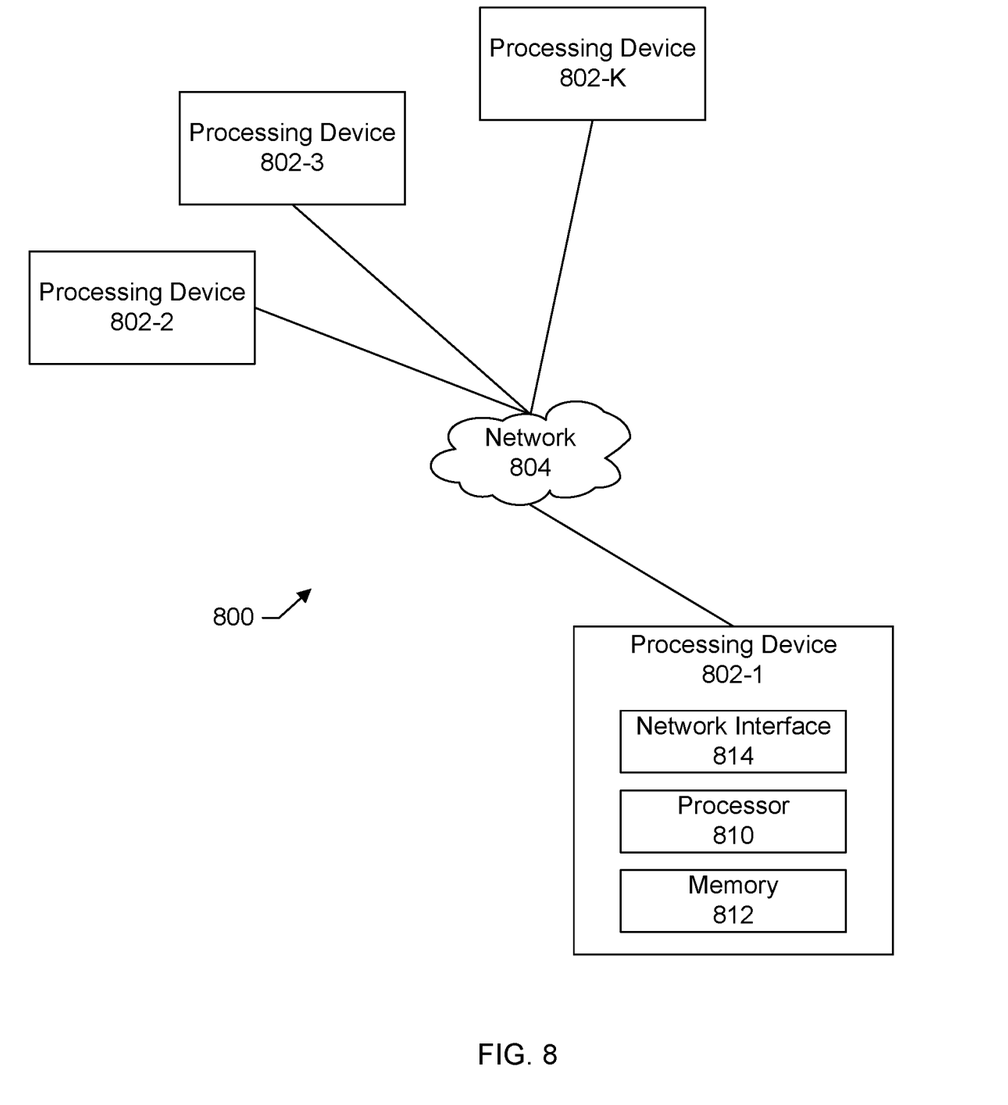
FIG. 8 shows a block diagram of a processing platform that may be utilized to implement at least a portion of an information processing system, according to one or more embodiments.

FIG. 8 shows an example of a processing platform 800. The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 1000 are illustratively implemented in the form of software running on one or more processing devices.

Figure 9:
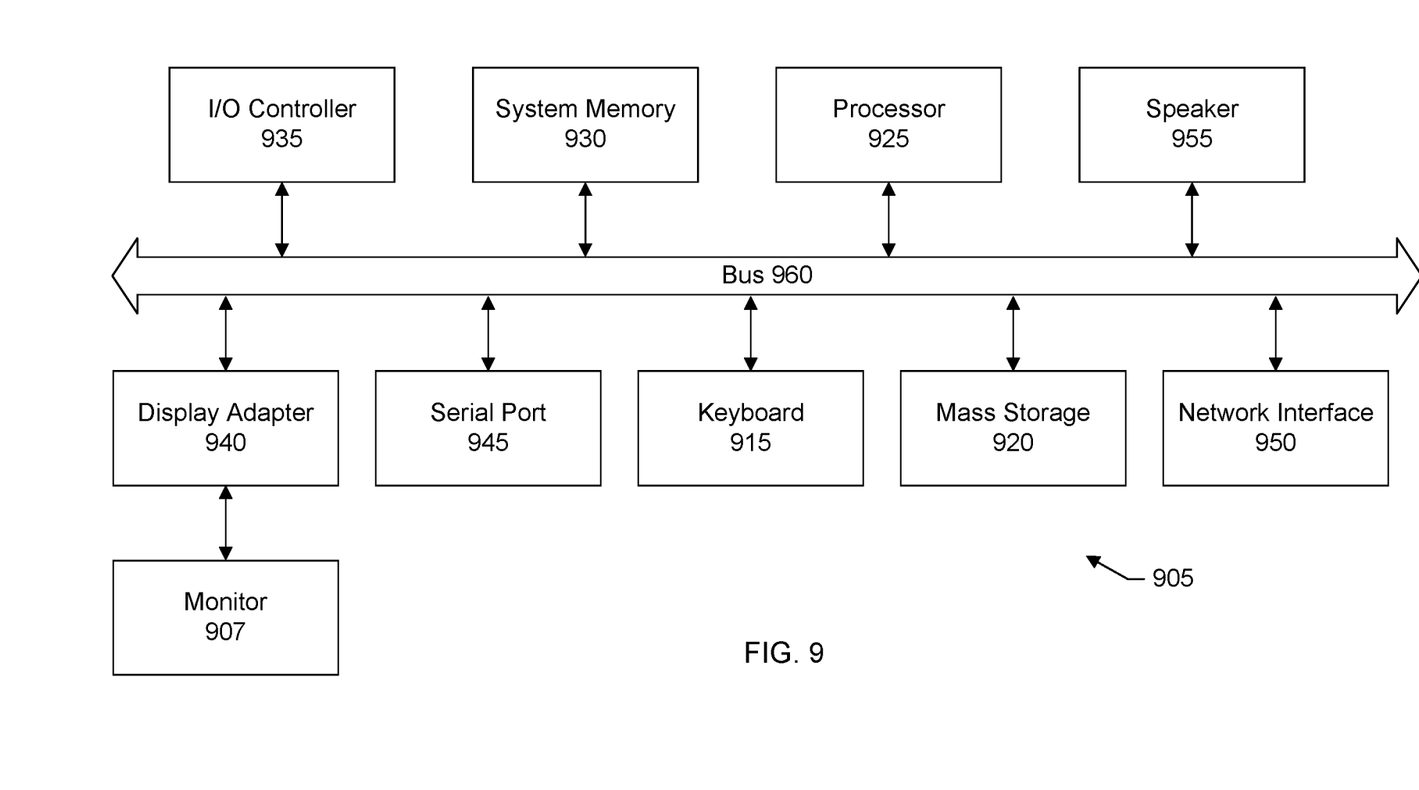
FIG. 9 shows a block diagram of a computer system suitable for use with the information processing system, according to one or more embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database,
    wherein the primary replica is available for read-write connections and the secondary replicas are available for read-only connections, and
    wherein the availability group is a clusterless availability group in which the one or more other nodes functioning as secondary nodes are not available as automatic failover targets should the primary node become unavailable;
    issuing, to a node in the availability group, a command to obtain a globally unique identifier (GUID) of the availability group; and
    directing, for an initial backup of the database, the node to backup a replica of the database being hosted by the node, the directing for the initial backup comprising instructing the node to index the initial backup against the GUID of the availability group, wherein the indexing of the initial backup against the GUID of the clusterless availability group thereby allows a subsequent backup of the database conducted using a different node in the availability group to be linked to the initial backup despite the subsequent backup being conducted using the different node.

2. The method of claim 1 wherein the GUID of the availability group is generated and assigned to the availability group by the RDBMS.

3. The method of claim 1 wherein the node in the availability group is a first node and the method further comprises:

directing, for the subsequent backup of the database, a second node in the availability group to backup a replica of the database being hosted by the second node, the directing for the subsequent backup comprising instructing the second node to index the subsequent backup against the GUID of the availability group, and wherein the initial backup of the database comprises a full backup, and the subsequent backup of the database comprises a differential backup.

4. The method of claim 3 further comprising:

linking the initial and subsequent backups of the database using the GUID of the availability group.

5. The method of claim 1 wherein the GUID of the availability group is different from a name of the node and a name assigned to the availability group by a user.

6. The method of claim 1 wherein after the initial backup of the database is completed, the database is forced by a user to failover to another node in the availability group, the other node being a second node, and the method further comprises:

issuing, to the second node in the availability group, a command to obtain the GUID of the availability group; and directing, for the subsequent backup of the database, the second node to backup a replica of the database being hosted by the second node, the directing for the subsequent backup comprising instructing the second node to index the subsequent backup against the GUID of the availability group.

7. A system comprising: a processor; and memory configured to store one or more sequences of instructions which, when executed by the processor, cause the processor to carry out the steps of:

determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database, wherein the primary replica is available for read-write connections and the secondary replicas are available for read-only connections, and wherein the availability group is a clusterless availability group in which the one or more other nodes functioning as secondary nodes are not available as automatic failover targets should the primary node become unavailable;

issuing, to a node in the availability group, a command to obtain a globally unique identifier (GUID) of the availability group; and directing, for an initial backup of the database, the node to backup a replica of the database being hosted by the node, the directing for the initial backup comprising instructing the node to index the initial backup against the GUID of the availability group, wherein the indexing of the initial backup against the GUID of the clusterless availability group thereby allows a subsequent backup of the database conducted using a different node in the availability group to be linked to the initial backup despite being the subsequent backup being conducted using the different node.

8. The system of claim 7 wherein the GUID of the availability group is generated and assigned to the availability group by the RDBMS.

9. The system of claim 7 wherein the node in the availability group is a first node and the processor further carries out the steps of:

directing, for the subsequent backup of the database, a second node in the availability group to backup a replica of the database being hosted by the second node, the directing for the subsequent backup comprising instructing the second node to index the subsequent backup against the GUID of the availability group, and wherein the initial backup of the database comprises a full backup, and the subsequent backup of the database comprises a differential backup.

10. The system of claim 9 wherein the processor further carries out the steps of:

linking the initial and subsequent backups of the database using the GUID of the availability group.

11. The system of claim 7 wherein the GUID of the availability group is different from a name of the node and a name assigned to the availability group by a user.

12. The system of claim 7 wherein after the initial backup of the database is completed, the database is forced by a user to failover to another node in the availability group, the other node being a second node, and the processor further carries out the steps of:

issuing, to the second node in the availability group, a command to obtain the GUID of the availability group; and directing, for the subsequent backup of the database, the second node to backup a replica of the database being hosted by the second node, the directing for the subsequent backup comprising instructing the second node to index the subsequent backup against the GUID of the availability group.

13. A computer program product, comprising a non-transitory computer-readable medium having a computer-readable program code embodied therein, the computer-readable program code adapted to be executed by one or more processors to implement a method comprising:

determining that a backup of a database in an availability group provided by a relational database management system (RDBMS) should be performed, the availability group comprising a node functioning as a primary node and hosting a primary replica of the database, and one or more other nodes functioning as secondary nodes and hosting secondary replicas of the database, wherein the primary replica is available for read-write connections and the secondary replicas are available for read-only connections, and wherein the availability group is a clusterless availability group in which the one or more other nodes functioning as secondary nodes are not available as automatic failover targets should the primary node become unavailable;

issuing, to a node in the availability group, a command to obtain a globally unique identifier (GUID) of the availability group; and directing, for an initial backup of the database, the node to backup a replica of the database being hosted by the node, the directing for the initial backup comprising instructing the node to index the initial backup against the GUID of the availability group, wherein the indexing of the initial backup against the GUID of the clusterless availability group thereby allows a subsequent backup of the database conducted using a different node in the availability group to be linked to the initial backup despite the subsequent backup being conducted using the different node.

14. The computer program product of claim 13 wherein the GUID of the availability group is generated and assigned to the availability group by the RDBMS.

15. The computer program product of claim 13 wherein the node in the availability group is a first node and the method further comprises:

directing, for the subsequent backup of the database, a second node in the availability group to backup a replica of the database being hosted by the second node, the directing for the subsequent backup comprising instructing the second node to index the subsequent backup against the GUID of the availability group, and wherein the initial backup of the database comprises a full backup, and the subsequent backup of the database comprises a differential backup.

16. The computer program product of claim 15 wherein the method further comprises:

linking the initial and subsequent backups of the database using the GUID of the availability group.

17. The computer program product of claim 13 wherein the GUID of the availability group is different from a name of the node and a name assigned to the availability group by a user.

18. The computer program product of claim 13 wherein after the initial backup of the database is completed, the database is forced by a user to failover to another node in the availability group, the other node being a second node, and the method further comprises:

issuing, to the second node in the availability group, a command to obtain the GUID of the availability group; and directing, for the subsequent backup of the database, the second node to backup a replica of the database being hosted by the second node, the directing for the subsequent backup comprising instructing the second node to index the subsequent backup against the GUID of the availability group.

19. The method of claim 1 further comprising:

based on the indexing of the initial backup against the GUID of the availability group, recognizing, at the subsequent backup of the database conducted at the different node in the availability group, that the initial backup of the database has been previously performed.

* * * * *